United States Patent [19]

Wells

[11] Patent Number: 4,842,132
[45] Date of Patent: Jun. 27, 1989

[54] DEVICE AND KIT FOR CLEANING LENSES OF TELESCOPES, CAMERAS AND THE LIKE

[75] Inventor: Thomas L. Wells, Houston, Tex.

[73] Assignee: Randalette, Inc., Houston, Tex.

[21] Appl. No.: 50,090

[22] Filed: May 14, 1987

[51] Int. Cl.⁴ ............................................. A47L 13/12
[52] U.S. Cl. ..................................... 206/229; 206/38; 132/313; 15/114; 15/159 A
[58] Field of Search ...................... 15/105.52, 106, 107, 15/114, 159 A; 206/5, 37, 38, 39.4, 229, 361, 216; 132/79 A, 81, DIG. 3

[56] References Cited

U.S. PATENT DOCUMENTS

| | | | |
|---|---|---|---|
| 651,841 | 6/1900 | Flemming | 15/159 A |
| 1,054,229 | 2/1913 | Methven | 132/81 |
| 1,261,502 | 4/1918 | Farrows | 15/134 |
| 1,355,026 | 10/1920 | Austin . | |
| 1,602,333 | 10/1926 | Burke . | |
| 2,165,150 | 7/1939 | Parker et al. | 15/105.32 |
| 2,583,228 | 1/1952 | Numbers | 88/1 |
| 2,633,236 | 3/1953 | Hempel | 206/361 |
| 3,102,294 | 9/1963 | Miller et al. | 15/97 |
| 3,309,728 | 3/1967 | Seaver | 206/361 |
| 3,344,461 | 10/1967 | Floor | 15/512 |
| 3,556,667 | 1/1971 | Kaufman | 15/114 |
| 3,648,318 | 3/1972 | Tsuruzawa | 206/38 R |
| 4,181,446 | 1/1980 | Kaufman | 15/114 |
| 4,301,916 | 11/1981 | Haidelman | 206/38 |

FOREIGN PATENT DOCUMENTS 890205 10/1942 France .

Primary Examiner—David T. Fidei
Attorney, Agent, or Firm—D. Arlon Groves

[57] ABSTRACT

A device and kit for cleaning generally convex surfaces of lenses of field articles such as hunting scopes, telescopes, cameras and the like.

7 Claims, 2 Drawing Sheets

DEVICE AND KIT FOR CLEANING LENSES OF TELESCOPES, CAMERAS AND THE LIKE

RELATED PATENT APPLICATIONS

This application is related to co-pending U.S. patent application Ser. No. 807,221 filed 10 Dec. 1985, now abandoned.

FIELD OF THE INVENTION

The present invention relates generally to lightweight, readily portable devices which can be easily carried into the field to clean the lenses of telescopes, hunting scopes, binoculars, cameras and the like. Such articles generally have outer protective lenses which are convex in shape and frequently are recessed deeply within cylindrical protective housings, thereby making access to, and cleaning of, such lenses difficult.

BACKGROUND OF THE INVENTION

No device adapted to clean the entirety of the outer surface of convex lenses recessed within a protective housing is known to applicant. Brushes, of a widely varied assortment of shapes and sizes, have of course been known for some time. However, the usefulness of even an optimally-shaped brush is limited to those instances in which the source of the visual interference is a particle, and a lightly-adhering particle, at that. While a brush can often remove a light particle from such an environment, all too often it merely succeeds in transferring the offending particle from one portion of the lens to another, usually to or near the "deepest" portion of the lens, i.e., that portion near the junction of the housing securing the lens or the protective cylinder. For heavier particles, brushes are generally ineffective, and they of course are completely ineffective for smudges and smears.

Most cameras, binoculars, and hunting scopes today commonly have protective end caps to protect the outer lenses from contact with dust particles and other contaminants. However, such protective end caps obviously can not remain over the lenses at all times, and when they are removed the lenses are directly exposed to foreign contaminants. Also, the protective caps can be, and often are, a source of contamination themselves; when removed, the caps are themselves exposed to the environment, and frequently pick up contaminants and transfer them to the lenses they were intended to protect upon being returned to their protective position.

Similarly, no lens cleaner particularly adapted to clean such lenses via the application of a cleaning solution and the subsequent application of a polishing paper is known to applicant. Rather, the sportsman is left to improvise such paraphernalia as best as he can, resulting in a procedure usually awkward at best in the comfort of the home and quite difficult, if not impossible, in the field. Inasmuch as a smudge or a smear could mean the difference between success or failure of a hunt or other outdoor expedition, there is clearly a need for a means whereby all such obstructions, regardless of their nature, may be quickly and conveniently removed in the field.

As earlier stated, no devices particularly designed to completely clean such lenses are known to applicant. U.S. Pat. No. 1,355,026, to Austin, discloses a fountain brush embodying a hollow handle into which the bristles are retractable. Such a device, though, being intended for use as a shaving brush, is obviously intended to deposit material on surfaces, not to remove particles from surfaces. Thus such a device does not readily suggest itself for adaptations or experiments on how to accomplish the opposite of its intended purpose.

Virtually all prior art brushes are similarly designed to apply, rather than to remove, foreign materials. French Patent No. 890,205, to Walter-Martin, discloses a variety of brushes which appear intended for use with the application of polishes and associated materials for fingernails. None appears suitable for the problem solved by applicant's invention, nor do they suggest modifications therefor.

U.S. Pat. No. 1,261,502 to Farrows discloses a fountain pen-like device for cleaning eyeglasses. The device provides a liquid container and a wick or swab associated therewith by which the liquid in said container may be caused to be in communication with the eyeglasses. The wick or swab is not itself retractable or extensible, but a surrounding sleeve may be withdrawn, after the end cap is removed, to expose the wick. The device thus provides only limited means for washing readily accessible objects such as eyeglass lenses, and leaves it up to the user to provide means for drying the lenses to complete the operation. Similar in purpose and construction is the device shown and described in U.S. Pat. No. 2,227,710 to Finn. The Finn device even more closely resembles a fountain pen container; when the top is removed, there is exposed a liquid-filled barrel portion with a pervious stopper therein for washing the eyeglasses. The top contains an inner container, for which no removal means are shown, but which must be removed in order to utilize the drying material contained therein. Upon removal of the inner container, a hairpin or similar implement must be utilized to provide access to the drying material. Such an arrangement depends upon gravity for supplying the cleaning fluid to the eyeglass and would not permit independent control of the amount of cleaning fluid applied, i.e., a fixed amount could not be applied independently of the amount of rubbing action applied in that the longer one rubbed, the more fluid that would be applied. Inasmuch as it is the drying action which is the most critical to the complete cleaning of lenses, the disadvantageousness of this feature is readily seen. Another disadvantageous feature is provided by the cumbersome nature of the operations for field use on, for example a rifle-mounted scope.

U.S. Pat. No. 2,583,228 to Numbers discloses a combined lens cover and lens brush for the lenses of cameras, telescopes, binoculars and the like. Inspection of the patent adds little to the title; it is readily seen to be simply a lens cap combined with a lens brush which may either be fixed, moveable, or removeable. Only the removeable version would seem to have any utility for lenses sized differently than the one for which the cap is designed; i.e., the attached versions would not seem to be suitable for lenses larger than the subject cap, thus requiring the purchase of a number of such protective devices and also limiting the usefulness thereof.

Various and sundry other artifacts and devices have been employed generally for cleaning eyeglass lenses and contact lenses. Exemplary of the former is U.S. Pat. No. 1,602,333, Burke, which discloses generally cup-shaped containers containing cores over which the lens cleaning elements are removably stretched. The inapplicability of such a device to the problem at hand is of course readily apparent. Exemplary of the latter are U.S. Pat. No. 3,344,461, Floor, and U.S. Pat. No. 3,102,294, Miller. Floor discloses preferably concave surfaces for receiving such lenses and saturatable pads for cleaning the same. Miller discloses a cup-shaped lens-cleaning head with a preformed body of foam rubber over which a cheesecloth cover may be placed. Neither, of course, readily lends itself to the present invention.

These and other limitations and disadvantages of the prior art, and especially of the aforementioned patents, are overcome with the present invention, and commercially acceptable embodiments of a readily portable device for cleaning hunting scopes, telescopes, cameras, binoculars and the like, in the field, are herein provided.

SUMMARY OF THE INVENTION

Accordingly, a feature of the present invention is to provide a readily accessible and protectable brush of a configuration which will allow its use on the greatest possible range of protected or recessed lenses for the ready removal of light particles such as dust and the like.

Another feature is to provide such a brush whose effective stiffness may be varied as may be required for the particular application.

Still another feature is to provide such a brush as will remove such particles altogether rather then merely transfer the same to other, more inaccessible locations.

Still another feature is to provide in combination therewith a generally concave cleaning head which will permit the ready cleaning in the field of such inaccessible lenses as those of rifle-mounted hunting scopes, and of lenses such as telescopes, cameras, binoculars, and the like.

Still another feature is to provide a cleaning head which will clean the entirety of the outer surface of such lenses, under field conditions.

Still another feature is to provide a cleaning head which will permit the application of a controlled amount of cleaning fluid, independent of the amount of swabbing action which may be required.

Still another feature is to provide means for drying such lenses under field conditions with optically acceptable materials.

Yet another feature is to provide cleaning and drying means which are incapable of trapping particulate matter so as to cause scratches or abrasions in the surfaces of said lenses.

The foregoing features and other features of the invention are realized in an illustrative embodiment of such a cleaning device and kit. Briefly stated, the invention is directed to an improved device for readily cleaning under field conditions the lenses of such articles as rifle-mounted scopes, telescopes, cameras, binoculars and the like of various shapes and sizes but characterized generally by convex lenses recessed within protective housings of various lengths. In contrast to the prior art, a preferred embodiment comprises a retractable brush with bristles biased to produce at least equal if not greater lens wiping action at the most recessed portions of such lenses, and constructed so as to permit the stiffness of such bristles to be varied as desired. The former is accomplished generally by shaping the tips of such bristles in a generally concave pattern, or other pattern which will permit the bristles at the outer periphery to extend at least as far, or further, than the bristles in the center of such brush. The latter is accomplished preferably by securing the bristles in a traveling head; when fully extended, such an embodiment provides no support or restraint for the bristles other than the head itself, thereby providing the maximum flexibility for such bristles. Upon partial retraction, the partially enclosing housing provides an unyielding support to such bristles, thereby effectively shortening the free ends of such bristles and providing a corresponding stiffening effect, particularly to the outermost or peripheral bristles. Further retraction provides still further effective shortening of the free end, and still further stiffening.

Another preferred embodiment approaches the opposite of the above, i.e., the tips of the bristles are shaped in the form of a shallow or flattened dome. With such a dome cut, the bristles of the outer periphery extend a shorter distance than the bristles in the center; the center bristles preferably do not extend so far as to form a true convex shape, but only far enough so as to form a substantially flattened dome shape. While this arrangement may be somewhat less well suited for removing particulate matter at the extreme edge portions of convex lenses, it nevertheless is preferable overall because of its superior ability to remove particles from the main portion of such lenses with a minimum of brushing action. Over the normal range of brushing motions over the main portions of such lenses—i.e., excluding the brushing motion required to remove particles from the extreme periphery—such a configuration normally presents substantially all of the tips of the bristles to the lens, resulting in a superior ability to dislodge and carry away particulate matter. With a concave pattern, as soon as a non-twirling stroke is begun, the longer bristles along the leading portion are substantially deflected, often so much so that only the sides of those bristles actually make contact with the lens, and often preventing many of the shorter center bristles from making any contact at all. Such a configuration thus often results in the lens being contacted only by the sides of the longer bristles along the leading periphery and the tips of the longer bristles along the trailing periphery, a condition inferior to configurations which present all or subtantially all of the tips to the lens sought to be cleaned.

Preferably affixed to the opposite end of the cleaning device of the instant invention is a generally concave tip of resilient material. A fine cell polyester or polyurethane material in the range of fifty to seventy pores per lineal inch (50–70 ppi) has been found suitable under all conditions. Such a tip could be used as the cleaning element itself, but preferably is not since the deposition thereon of any abrasive particle, or the buildup of any abrasive material, could easily scratch the lens sought to be cleaned or, in the case of externally coated lenses, damage one or more of such coatings. Rather, and preferably, one or more drops of cleaning solution particularly designed for cleaning multi-coated lenses or filters are placed on a disposable swatch of soft lens cleaning tissue which in turn is placed either on the lens to be cleaned or on the resilient tip of the cleaning device which is then used to clean the lens. The cleaning tissue may then be disposed of, and the cleaning operation may be completed by the drying of the lens in a similar manner with a dry, disposable cleaning tissue.

It has also been found that cloths—i.e., material of woven fabric—are capable of trapping particulate matter in the recesses among the threads in such a way as to cause the particulate matter to scratch sensitive lenses or coatings. This highly undesireable result may be prevented by the use of substantially homogeneous, smooth-surfaced media as the cleaning means. A nonwoven swatch made of polyester pulp with a density of around 280 grams/square yard and a tensile strength on the order of from about 0.9 CD to about 3.5 MD has been found to be particularly advantageous. Such smooth-surfaced media have no voids or recesses in which the particulate matter can lodge edge-wise and present another edge to the lens surface. Such particles as are not removed by the brush will tend to be shaped somewhat flake-like, i.e., they will tend toward a flat, approximately two-dimensional shape with a large enough surface area on the largest surface to be capable of excluding enough air molecules between it and the lens surface as to enable the particle to adhere to the lens surface. If such particles can be lifted from the lens surface by the wetting action of a thin film of cleaning fluid without becoming entrapped edge-wise in a recess of a woven cleaning cloth, they can be maintained in an orientation in which the flatter surface is more or less parallel to the lens surface and insulated therefrom by the thin layer of fluid; disposal of the wet cleaning swatch will then dispose of the potentially lens-scratching particle without damage. However, if the particle is lifted by a thin film and then trapped in a non-parallel orientation by a woven swatch, the exposed edge of such particle is more likely to penetrate the thin film and to scratch the lens. Circular swatches or polygonal swatches have been found particularly advantageous in that they may cover substantially all or a substantial portion of the lenses to be cleaned without an entrapping fold. It has also been found preferable for such swatches to have a minimum diameter at least as great as the largest diameter of the concave tip used to uniformly distribute the cleaning force over the surface of such lenses.

In this manner, virtually any visual obstruction — ranging from the lightest dust particle to the heaviest smudge or smear—may be readily, conveniently, and safely removed, in the field.

IN THE DRAWINGS

DESCRIPTION

Figure 1:
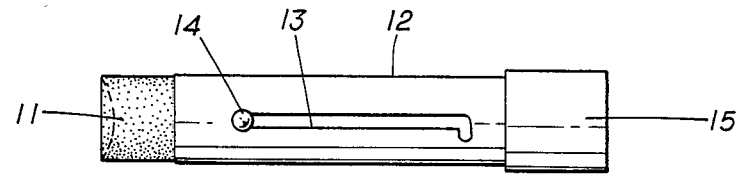
FIG. 1 is a top elevation of a cleaning device embodying the concepts of the present invention.
Figure 2:
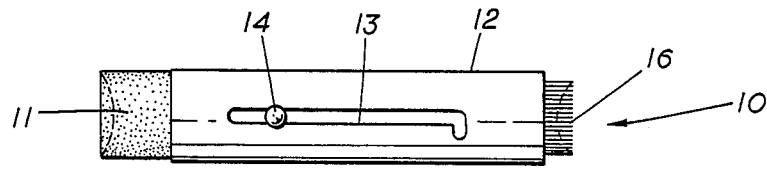
FIG. 2 is a top elevation of the same device with the protective end cap removed and the cleaning bristles partly deployed.

Referring now to the drawings in which like numerals denote similar elements and more particularly to FIG. 1, there is shown, by way of illustration, but not of limitation, a cleaning device 10 constructed according to the present invention comprising a resilient tip 11, a housing 12 supporting said resilient tip, a groove 13 in said housing, a moveable button 14 moveable in said groove, and end cap 15. FIG. 2 depicts the same embodiment with end cap 15 removed and bristles 16 partially visible. Although in the embodiment shown, the bristles 16 and the resilient tip 11 are shown as being affixed to the same member, they need not be; cap 15, for example, could just as easily serve as a handle for brush 16 which could be enclosed in housing 12, for example.

Figure 3:
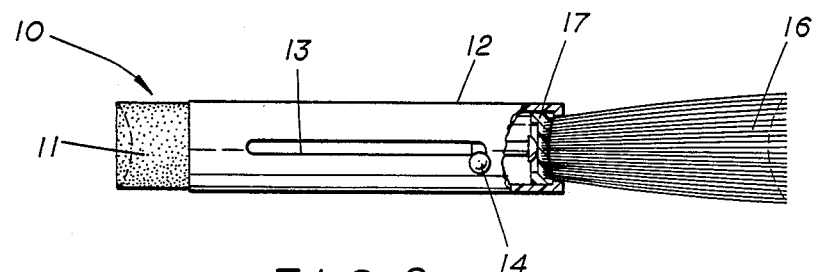
FIG. 3 is the same elevation with the bristles deployed to their full length.

In the embodiment shown, button 14 communicates directly with the diaphragm 17 containing the bristles 16. The brush may be advanced in this embodiment by advancing the button 14 along groove 13. Other means of providing such advancement may be employed equally well, such as a rotating handle with screw threads. Whatever the means, as may be seen by comparing the bristles 16 in FIGS. 2 and 3, no advancement or slight advancement will provide the stiffest brushing action, and continued advancement will provide a greater effective length of the bristles and, hence, more flexible brushing action. FIG. 3 depicts the bristles extended to their maximum extension and the advancing button 14 locked into its maximum position.

Normally, the amount of force applied to the bristles during cleaning will be small enough, and the amount of resistance in the advancing mechanism will be large enough, that there will be no need to "lock" the bristles in place. For that reason, no intermediate locking positions are shown in this embodiment, although the same could be easily included were it desired so to do.

The free ends of bristles 16 are shown in FIGS. 2 and 3 in one preferred state as forming a generally convex shape. This shape, or its many equivalents, has been found to provide the best cleaning action for the edges of recessed convex lenses and is thus one preferred embodiment.

Figure 4:
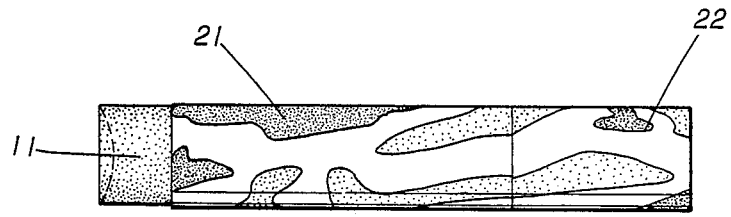
FIG. 4 is a top elevation of another embodiment of the present invention.
Figure 5:
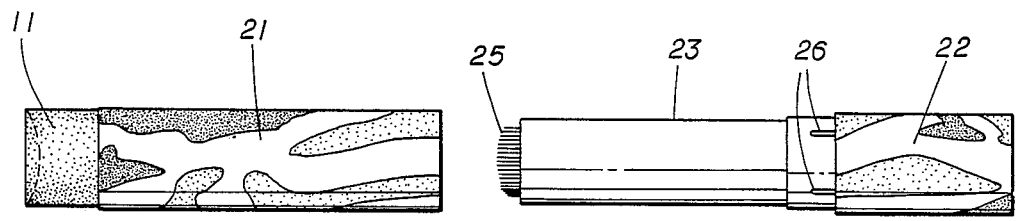
FIG. 5 is a top elevation of the same device with the protective end cover removed.
Figure 6:
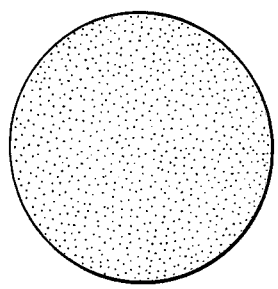
FIG. 6 is the same elevation of the brush portion of FIG. 5 with the bristles fully extended.

FIGS. 4, 5 and 6 show another preferred embodiment. FIG. 4 shows the cleaning device in a closed form and with an optional camouflaged exterior finish. As best illustrated in FIG. 5, the protective end cap 21 also supports resilient tip 11 and is removeable from barrel housing 23. Handle 22 may be rotated with respect to housing 23 and thereby advance or retract the bristles of brush 24 to a desired extension and stiffness, which bristles are shown fully extended in FIG. 6. The dome cut tip ends 25 of brush 24 may best be seen in FIG. 5. Protective covering 21 may be removably secured to the brush means by frictional engagement with a plurality of ridges 26 located on said housing 23 or by other convenient means.

Figure 7:
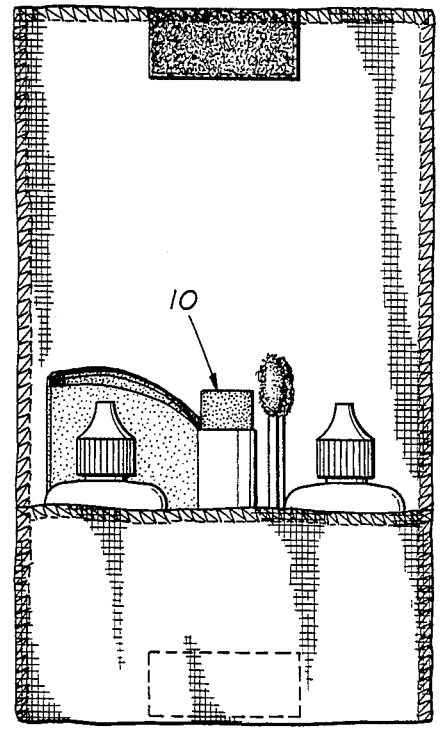
FIG. 7 is a front elevation of the kit for carrying the cleaning device of the present invention and associated cleaners and tissues.

FIG. 7 depicts a convenient kit for carrying the device of the present invention along with a container of cleaning fluid for multi-coated filters and lenses, a container for anti-fog solution, and a number of disposable, optically-safe cleaning tissues.

Figure 8:
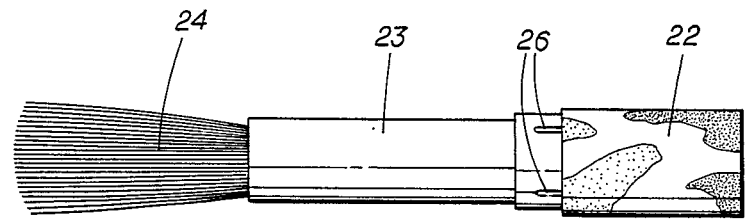
FIG. 8 is a top elevation of one embodiment of the cleaning swatch.

FIG. 8 shows one preferred form of a smooth-surfaced disposable cleaning means, which may alternatively be shaped in a polygonal form.

Thus it may be seen that a convenient and easily transportable kit has been provided for the rapid and safe cleaning, in the field, of recessed convex lenses, or for the safe and effective application of anti-fogging or other special-purpose solutions, as well as a novel brush for use therewith.

It will be apparent from the foregoing that many other variations and modifications may be made in the apparatus hereinbefore described by those having experience in this technology without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A device for cleaning convex lenses, comprising:
an elongated holder supporting tip means at one end thereof for transferring a cleaning force applied to said holder to said tip means and for distributing said force substantially uniformly over an outer surface of said lens, at least one surface of said tip means comprising symmetrically concave and resilient means for applying disposable cleaning means to substantially all of the outer surface of a recessed, convex lens; and
brush means supported at another end of said elongated holder for removing particulate matter from said convex lenses.

2. The cleaning device as defined in claim 1, further comprising:
means supported intermediate tip means and said brush means for advancing or retracting said brush means; and
means detachably supported by said elongated holder for covering or exposing said brush means.

3. The cleaning device as defined in claim 2, wherein said brush means comprises bristles of goat hair quality with dome cut tips.

4. The cleaning device as defined in claim 2, wherein said means for covering or exposing said brush means comprises the elongated holder supporting said tip means.

5. A portable kit for cleaning convex lenses in the field comprising:
an improve device comprising an elongated holder supporting tip means at one end thereof for transferring a cleaning force applied to said holder to said tip means and for distributing said force substantially uniformly over an outer surface of said lens, and brush means for removing dry particulate matter from the entirety of the surface of a recessed, convex lens;
disposable cleaning means comprising a substantially homogeneous smooth-surfaced media;
means for containing and for dispensing preselected amounts of solution to said cleaning means; and
rapid-opening means for transporting said improved cleaning device, said disposable cleaning means, said containing and dispensing means, and said brush means.

6. The cleaning kit as defined in claim 5, wherein said media comprises a substantially absorptive, non-woven swatch with a minimum diameter at least as great as the greatest dimension of the surface of said tip means presented to said lenses.

7. The cleaning kit as defined in claim 5, wherein said media comprises a non-woven swatch of polyester pulp of generally circular configuration.

* * * * *